US008249065B2

(12) United States Patent
Samprathi

(10) Patent No.: US 8,249,065 B2
(45) Date of Patent: Aug. 21, 2012

(54) DESTINATION MAC AGING OF ENTRIES IN A LAYER 2 (L2) FORWARDING TABLE

(75) Inventor: Ravikanth Samprathi, San Jose, CA (US)

(73) Assignee: Cisco Technology, Inc., San Jose, CA (US)

(*) Notice: Subject to any disclaimer, the term of this patent is extended or adjusted under 35 U.S.C. 154(b) by 551 days.

(21) Appl. No.: 12/050,479

(22) Filed: Mar. 18, 2008

(65) Prior Publication Data

US 2009/0238179 A1   Sep. 24, 2009

(51) Int. Cl.
*H04L 12/28* (2006.01)
(52) U.S. Cl. ............... 370/389; 370/392; 370/395.3; 370/395.31
(58) Field of Classification Search .............. None
See application file for complete search history.

(56) References Cited

U.S. PATENT DOCUMENTS

| | | | |
|---|---|---|---|
| 6,178,414 B1 * | 1/2001 | Beckmann et al. | 707/3 |
| 6,721,277 B1 * | 4/2004 | Yu et al. | 370/251 |
| 6,829,651 B1 * | 12/2004 | Bass et al. | 709/238 |
| 7,149,214 B2 * | 12/2006 | Wu et al. | 370/389 |
| 2008/0101234 A1 * | 5/2008 | Nakil et al. | 370/235 |

* cited by examiner

*Primary Examiner* — Bob Phunkulh
*Assistant Examiner* — Jenkey Van
(74) *Attorney, Agent, or Firm* — Charles E. Krueger

(57) ABSTRACT

In one embodiment, entries in an address table of the forwarding engine in a linecard or supervisor are updated to a current time value when the MAC address in the entry matches the destination MAC address of a received packet to prevent flooding if the linecard or supervisor is a non-ingress linecard or supervisor of an asymmetrically routed flow.

14 Claims, 3 Drawing Sheets

DESTINATION MAC AGING OF ENTRIES IN A LAYER 2 (L2) FORWARDING TABLE

TECHNICAL FIELD

The present disclosure relates generally to avoiding flooding when a flow is asymmetrically routed and the address table on a non-ingress linecard or supervisor does not include the destination address for return traffic.

BACKGROUND OF THE INVENTION

A typical router or switch configuration includes a chassis which contains basic components such as power supply, fans, and multiple slots which have interface cards and network modules. The linecards (interface cards and network modules) which are inserted into slots handle packet ingress and egress and other networking functions. Line cards provide one or more interfaces over which traffic flows. Thus, depending on the number of slots and interfaces, a switch or a router can be configured to work with a variety of networking protocols. Some switches are fixed configuration switches that do not use line cards to implement interfaces.

A switch includes a central forwarding engine, the supervisor, and switches utilizing line cards may implement the distributed learning and forwarding model where linecards that are distributed-forwarding-enabled make forwarding decisions locally, leaving the supervisor engine free to perform routing and management functions. Distributed Forwarding requires that the Layer 2 (L2) Medium Access Control (MAC) address tables exist on the supervisor and multiple linecards in the system.

Linecards and the supervisor build address tables by examining the source address on each incoming packet and associating the source address with the port on which the packet was received. When a packet is received its destination address is looked up in the address table and, if there is a hit, the linecard outputs the packet on the port associated with the looked-up address.

A flow is asymmetrically routed if the transmit path from A to B is different from the return path from B to A, where A and B represent ports in the switch or router.

DESCRIPTION OF EXAMPLE EMBODIMENTS

Overview

Reference will now be made in detail to various embodiments of the invention. Examples of these embodiments are illustrated in the accompanying drawings. While the invention will be described in conjunction with these embodiments, it will be understood that it is not intended to limit the invention to any embodiment. On the contrary, it is intended to cover alternatives, modifications, and equivalents as may be included within the spirit and scope of the invention as defined by the appended claims. In the following description, numerous specific details are set forth in order to provide a thorough understanding of the various embodiments. However, the present invention may be practiced without some or all of these specific details. In other instances, well known process operations have not been described in detail in order not to unnecessarily obscure the present invention. Further, each appearance of the phrase "an example embodiment" at various places in the specification does not necessarily refer to the same example embodiment.

In an example embodiment, the destination MAC address of a received packet is looked up on a linecard, with the linecard including a plurality of ports with each port identified by a port ID, and with the linecard having an address table having entries including a MAC address, a port ID, and a time value, with entries in the address table created by associating a source MAC address with the port on which a packet having the source MAC address is received.

When destination MAC aging is enabled on the linecard or supervisor, the time value of the entry in the address table including the destination MAC address of the received packet is updated with a current time value, and the DMA bit in the address table entry is set, if an entry for the destination MAC address is included in the address table.

Description

When a linecard or supervisor receives a message with a destination address that is not in the address table the linecard or supervisor does not drop the message. Instead, it broadcasts the message to all its ports in a process called flooding. As will be described in more detail below, flooding causes network problems and therefore should be avoided.

In many topologies and in many traffic flows, particularly with (1) asymmetric routing on regular non-distributed non-Etherchannel traffic, (2) L2 non-routing distributed Etherchannel traffic, or (3) L2 routing distributed Etherchannel traffic, to avoid flooding the L2 MAC address table entries of the destination MAC addresses need to be available on the linecard forwarding engines which do not necessarily see the traffic with the source MAC address.

Figure 1A:
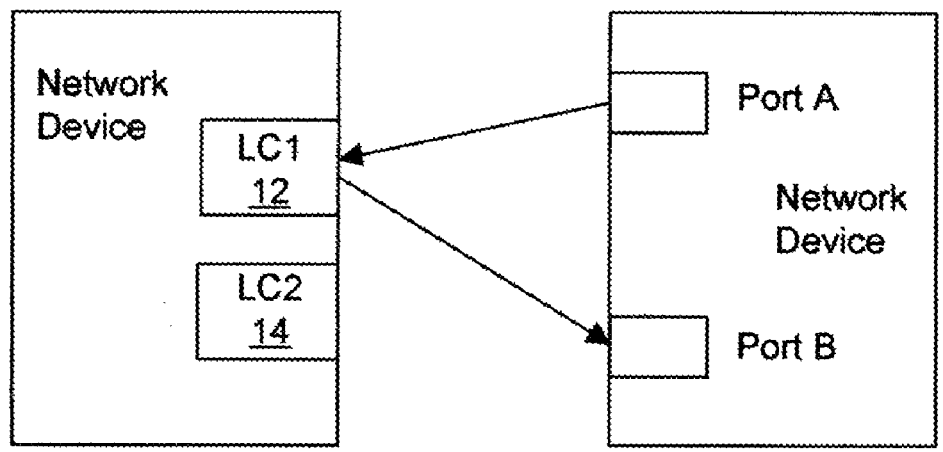
FIGS. 1A and 1B illustrates an example topology that asymmetrically routes a flow between ports A and B.
Figure 1B:
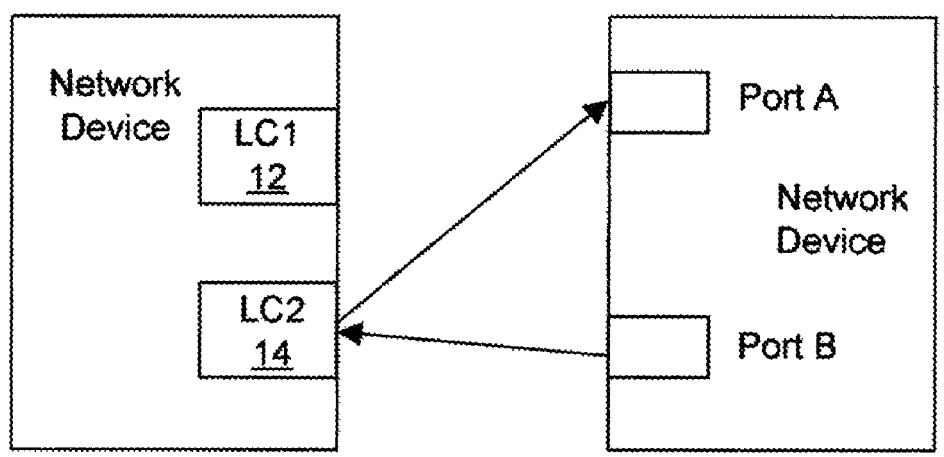

FIGS. 1A and 1B depict an example topology having asymmetric routing of a flow (flow(z)). In FIG. 1 packets in flow(z) sent from A→B (source address A: destination address B) travel a different route than packets in flow(z) on the return path of B→A (source address B: destination address A where A and B are ports on a network device). The first linecard (or supervisor) 12 will examine a packet in the flow and insert source address A in its address table as a primary entry. The second linecard 14 never receives any packets having source address A because the transmit route from and return route to source A are different and the second linecard (or supervisor) 14 only receives packets having source address B.

When a return packet arrives at the second linecard 14 the destination address A will be looked up in the address table of the second linecard 14. If an entry with address A is not present the second linecard 14 will flood the packet.

Protocols exist for synchronizing MAC address tables across multiple line cards. For example, in one protocol MAC Notification Packets are utilized to synchronize the address tables.

Referring again to FIG. 1, the second linecard 14 will insert address A into its address table as a non-primary entry when its address table is synchronized with the address table of the first linecard 12. However, with respect to address A, the second linecard is a non-ingress linecard because a packet with source address A is never received at any of its ports.

Additionally, for a port aggregation technology, such as Etherchannel, the MAC Notification Packet will be sent on only one link because of load sharing and some linecards will not receive the Notification Packet and therefore not add address A as a non-primary entry.

Linecards must drop stale addresses from the address table to keep the address tables from overflowing. An aging process is performed on the linecard to drop any entry holding a source address that has not been updated for, typically, five minutes.

Accordingly, for the example system of FIG. 1 the entry for address A in the address table of the second linecard 14 would be dropped five minutes after synchronization because no packets with source address A are received on the second linecard 14. Subsequent packets in the return path of the flow having destination address A would cause the second linecard to implement flooding and broadcast address A on all the ports in the switch which are in the same broadcast domain.

Figure 2:
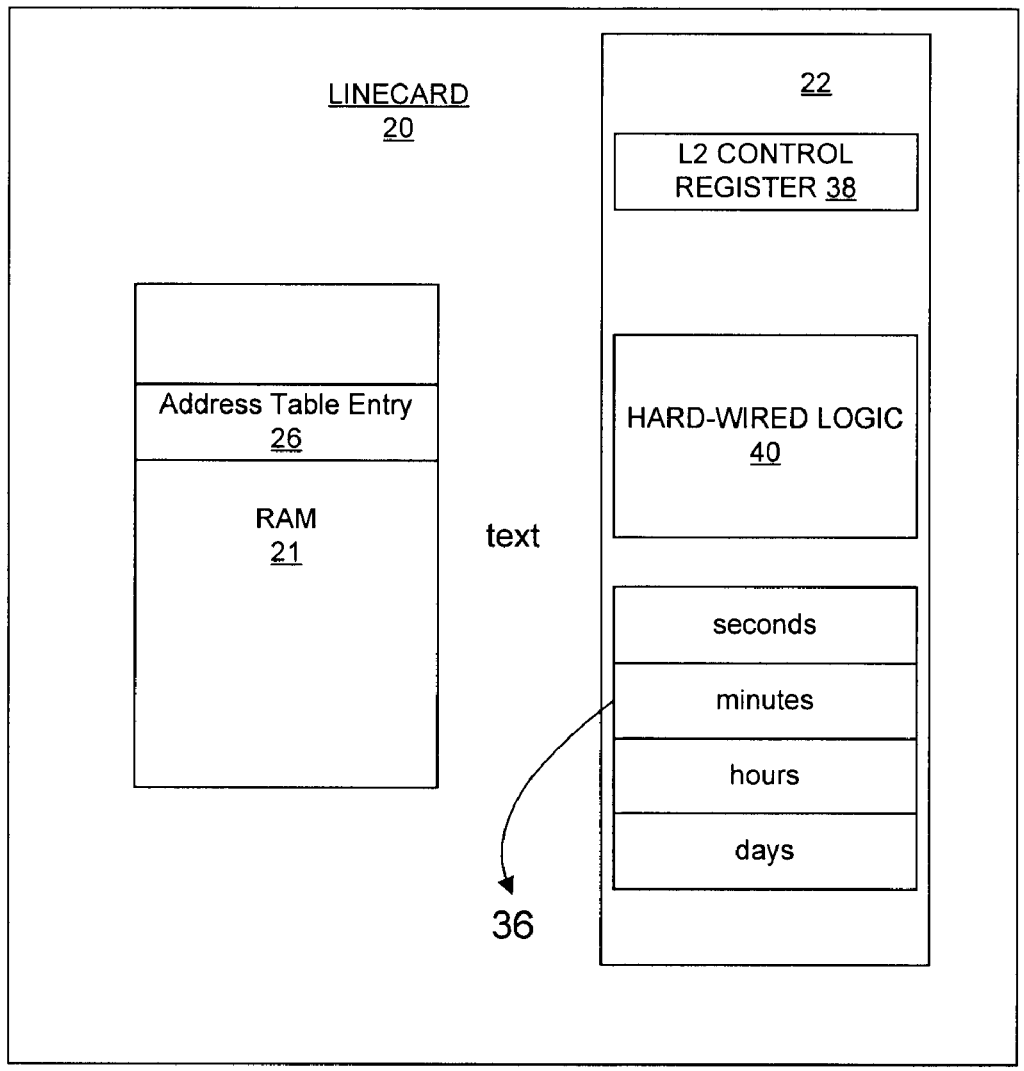
FIG. 2 illustrates an example embodiment of an apparatus for implementing destination MAC address aging.

FIG. 2 is a schematic block diagram illustrating an example embodiment for implementing destination MAC aging. FIG. 2 does not depict an actual system but indicates the components utilized in this example embodiment.

In this example embodiment a destination MAC aging protocol is implemented in hardware, for example in an Application Specific Integrated Circuit (ASIC) included in the forwarding engine of a linecard 20. FIG. 2 depicts a Dynamic Random Access Memory (DRAM) 21 and an ASIC 22. The DRAM 21 has entries 26 for storing a MAC address, a time value, and Destination MAC Aging (DMA) flag. The ASIC 22 includes a set of current time registers 36 holding for example, the second, minute, hour, day values of the current time, an L2 control register 38 including a DMA bit, and logic 40 for executing the aging process.

Figure 3:
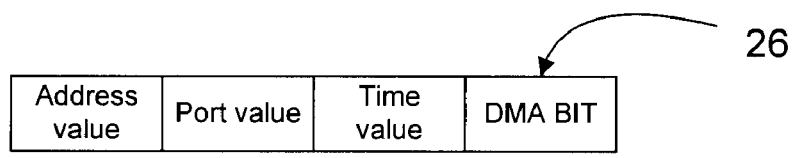
FIG. 3 illustrates an example address table entry.

FIG. 3 depicts an address table entry 26 which includes an address word holding an address value, a port value, time value, and a DMA bit. For standard linecards that only implement source MAC aging, when a current packet is received at a port of the linecard 20 the address table is searched for the value of the source address. If the source address is not in the table (a miss) then a new entry is created with the new entry holding an address word equal to the source address of the current packet, a port value equal to the port on which the current packet was received, and a time value equal to the time of receipt of the current packet. If the source address matches an entry in the address table (a hit) then the value in the entry is updated to a current time value.

Accordingly, the entry for address A in the address table includes a time value that is updated each time a packet with source address A is received at a port of the first linecard. This time value in each entry of the address table is periodically compared to a current time value and if the difference between the current time value and the time value of the entry exceeds a time out value than the entry is removed from the address table.

As depicted in FIG. 1, because the second linecard 14 is non-ingress and does not receive packets having source address A the time value is never updated. If address A were received during synchronization with the first line card then the time value in the address A entry at the second linecard 14 would be the time value when synchronization occurred. Since the time value is never updated, address A would be dropped from the address table of the second linecard 14 when the timeout period expires.

If a packet arrives at a linecard and the destination address of the packet is not included in the address table of the linecard then the linecard implements flooding to broadcast the message to all the ports in the switch that are in the same broadcast domain. Thus, in the example of FIG. 1, when a B→A packet is received at the second linecard 14 after address A has been removed, the second linecard will flood the packet.

The flooding process includes sending flood packets which include the destination address, in this example address A, of the packet. When device A receives the flood packet it will recognize its address and send an acknowledge packet to the second linecard 14. Since the acknowledge packet has address A as the source address it will be added to the address table of the second linecard with the value of the time value set to the time of receipt of the acknowledge packet from device A. However, address A will again be dropped after the time out period and the flooding process will have to be repeated.

Flooding causes problems such as bandwidth oversubscriptions, fabric utilizations, breaking of secure connections, etc. Floods are not tolerable for customers since floods clog the bandwidth to servers, particularly in data centers and server farms. For example if a customer has a million flows, one flood packet every five minutes on one flow will cause the sending of five million flood packets to each port in the VLAN of each flow. This is catastrophic and results in crashing the servers.

Figure 4:
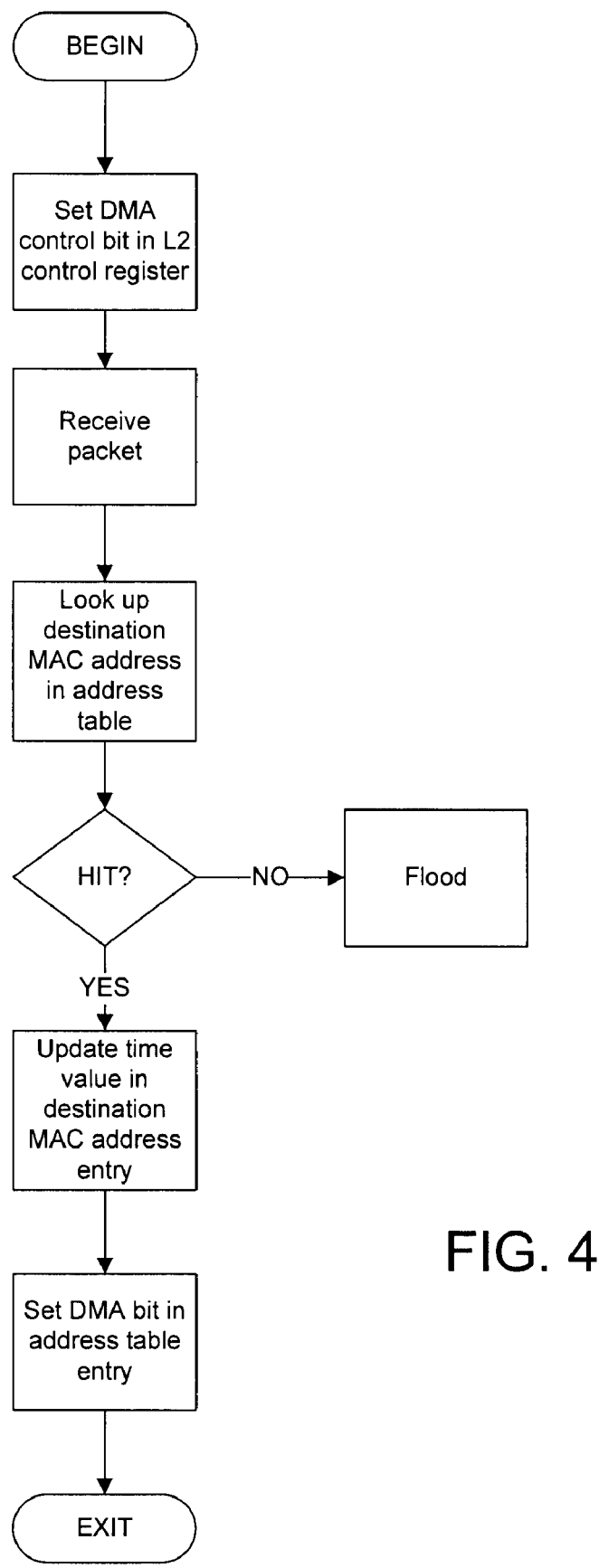
FIG. 4 illustrates a flowchart of the steps performed in an example embodiment.

The Destination MAC Aging (DMA) bit in the L2 control register is used to determine if aging has to be done for destination MAC entries or not. If this bit is set, then each packet's destination MAC address is also used to update the time value in the address table entry. Referring now to FIGS. 2-3 and the flow chart of FIG. 4, whenever the destination bit (DMA) is set in the L2 control register (destination MAC aging is globally enabled), the linecard examines received packets B→A for the destination MAC address A and the address table is checked to determine whether an entry for destination MAC address A is present. If there is a hit then the time value in the entry holding destination MAC address A is updated. Thus, the time value for the destination MAC address A entry is updated whenever a B→A is received at the second linecard. Additionally, the DMA flag in the entry for destination MAC address A is set. This is for distinguishing the entries having the time stamp updated based on the source MAC address. The DMA bit in the L2 control register is set based on a command run by the customer in the switch configuration. If the customer enables destination MAC aging, then the DMA bit is set in the L2 control register.

If B→A traffic is continually being received at the second linecard the time value of the destination address entry will be continually updated and the aging process will not remove address A from its address table. Accordingly, the second linecard will not be flooding all its ports with address A every five minutes and the problems described above due to flooding will be avoided.

The invention has now been described with reference to the example embodiments. Alternatives and substitutions will now be apparent to persons of skill in the art. As is understood by persons of skill in the art, the ASIC depicted in FIG. 2 can use hard wired logic or a processor executing program code to implement destination MAC aging. Accordingly, it is not intended to limit the invention except as provided by the appended claims.

What is claimed is:

1. A method performed by a processor in a forwarding engine included in a first linecard or supervisor on a first network device in a plurality of network devices, where the first linecard or supervisor includes a plurality of ports with each port identified by a port ID, where the forwarding engine is configured to receive a packet including a source address and a destination address, with the source address identifying a source port on a second network device in the plurality of network devices, coupled to the first linecard or supervisor, that sent the packet to the first linecard or supervisor and a destination address indicating a port of a network device in the plurality of network devices to which the packet is to be sent, said method comprising:

enabling destination Media Access Control (MAC) address aging on the forwarding engine of the first linecard or supervisor;

looking up the destination MAC address of a received packet in an address table maintained by the forwarding engine of the first linecard or supervisor, with the address table having primary entries that include the source address of a packet received by the first linecard or supervisor, a time value indicating the time the packet was received, a destination MAC address flag, and a port ID indicating the port of the first linecard or supervisor that received the packet, with the port ID stored in the primary entry indicating which port of the first linecard or supervisor is coupled to the source port of the second network device identified by the source address, where the received packet is received at a current time value and where the received packet is included in an asymmetric flow so that packets having a source address corresponding to the destination address of the received packet are not received at the forwarding engine of the first linecard or supervisor except in response to flooding, with primary entries in the address table created by associating a source MAC address with the port of the first linecard or supervisor on which a packet having the source MAC address is received;

updating the time value of the entry in the address table including a source MAC address that is the same as the destination MAC address of the received packet with the current time value so that the entry in the address table including a source address which is the same as the destination MAC address of the received packet will not time out and require the forwarding engine of the first linecard or supervisor to flood the received packet; and setting the destination MAC address table flag in the entry in the address table including a source address which is the same as the destination MAC address to distinguish entries having the time value updated based on the destination MAC address of received packets from entries having the time valued updated based on a source MAC address of received packets.

2. The method of claim 1 further comprising:

removing an address table entry when the difference between the time value of the entry and a current time value exceeds a timeout value.

3. The method of claim 1 further comprising:

adding non-primary addresses to the address table during synchronization with other linecards.

4. The method of claim 1 where enabling destination MAC address aging comprises:

setting a destination MAC address control bit in an L2 control register to globally enable destination MAC address aging.

5. The method of claim 1 further comprising:

distinguishing address table entries updated based on a source MAC address.

6. An apparatus comprising:

means for enabling destination Media Access Control (MAC) address aging on a forwarding engine included in a first linecard or supervisor on a first network device in a plurality of network devices, where the first linecard or supervisor includes a plurality of ports with each port identified by a port ID, where the forwarding engine is configured to receive a packet including a source address and a destination address, with the source address identifying a source port on a second network device in the plurality, coupled to the first linecard or supervisor, that sent the packet to the first linecard or supervisor and a destination address indicating a port of a network device in the plurality of network devices to which the packet is to be sent;

means for looking up the destination MAC address of a received packet in an address table maintained by the forwarding engine of the first linecard or supervisor, with the address table having primary entries that include the source address of a packet received by the first linecard or supervisor, a time value indicating the time the packet was received, a destination MAC address flag, and a port ID indicating the port of the first linecard or supervisor that received the packet, with the port ID stored in the primary entry indicating which port of the first linecard or supervisor is coupled to the source port of the second network device identified by the source address, where the received packet is received at a current time value and where the received packet is included in a n asymmetric flow so that the packets having a source address corresponding to the destination address of the received packet are not received at the forwarding engine of the first linecard or supervisor except in response to flooding, with primary entries in the address table created by associating a source MAC address with the port of the first linecard or supervisor on which a packet having the source MAC address is received;

means for updating the time value of the entry in the address table including a source MAC address that is the same as the destination MAC address of the received packet with the current time value so that the entry in the address table including a source address which is the same as the destination MAC address of the received packet will not time out and require the forwarding engine of the first linecard or supervisor to flood the received packet;

means for setting the destination MAC address table flag in the entry in the address table including a source address which is the same as the destination MAC address to distinguish entries having the time value updated based on the destination MAC address of received packets from entries having the time value updated based on a source MAC address of received packets.

7. The apparatus of claim 6 further comprising:

means for removing an address table entry when the difference between the time value of the entry and a current time value exceeds a timeout value.

8. The apparatus of claim 6 further comprising:

means for adding non-primary addresses to the address table during synchronization with other linecards.

9. The apparatus of claim 6 where means for enabling destination MAC address aging comprises:

means for setting a destination MAC address control bit in an L2 control register to globally enable destination MAC address aging.

10. The apparatus of claim 6 further comprising:

means for distinguishing address table entries updated based on a source MAC address.

11. An apparatus comprising:

a first linecard or supervisor including a forwarding engine on a first network device in a plurality of network devices, where the first linecard or supervisor includes a plurality of ports with each port identified by a port ID, where the forwarding engine is configured to receive a packet including a source address and a destination address, with the source address identifying a source port on a second network device in the plurality of network devices, coupled to the first linecard or supervisor, that sent the packet to the first linecard or supervisor and a destination address indicating a port of a network device in the plurality of network devices to which the packet is to be sent and a memory holding address tables;

with the forwarding engine configured to enable destination Media Access Control (MAC) address aging on the forwarding engine of the first linecard or supervisor, to look up the destination MAC address of a received packet in an address table maintained by the forwarding engine of the first linecard or supervisor, with the address table having primary entries that include the source address of a packet by the first linecard or supervisor, a time value indicating the time the packet was received, a destination MAC address flag, and a port ID indicating the port of the first linecard or supervisor that received the packet, with the port ID stored in the primary entry indicating which port of the first linecard or supervisor is coupled to the source port of the second network device identified by the source address, where the received packet is received at a current time value and where the received packet is included in an asymmetric flow so that packets having a source address corresponding to the destination address of the received packet are not received at the forwarding engine of the first linecard or supervisor except in response to flooding, with primary entries in the address table created by associating a source MAC address with the port of the first linecard or supervisor on which a packet having the source MAC address is received, to update the time value of the entry in the address table including a source MAC address that is the same as the destination MAC address of the received packet with the current time value so that the entry in the address table including a source address which is the same as the destination MAC address of the received packet will not time out and require the forwarding engine of the first linecard or supervisor to flood the received packet and to set the destination MAC address table flag in the entry in the address table including a source address which is the same as the destination MAC address to distinguish entries having the time value updated based on the destination MAC address of received packets from entries having the time valued updated based on a source MAC address of received packets.

12. The apparatus of claim 11 with the logic block further configured to:
   add non-primary addresses to the address table during synchronization with other linecards.

13. The apparatus of claim 11 with the logic block further configured to:
   set a destination MAC address control bit in an L2 control register to globally enable destination MAC address aging.

14. The apparatus of claim 11 with the logic block further configured to:
   distinguish address table entries updated based on a source MAC address.

* * * * *